Figure 1:
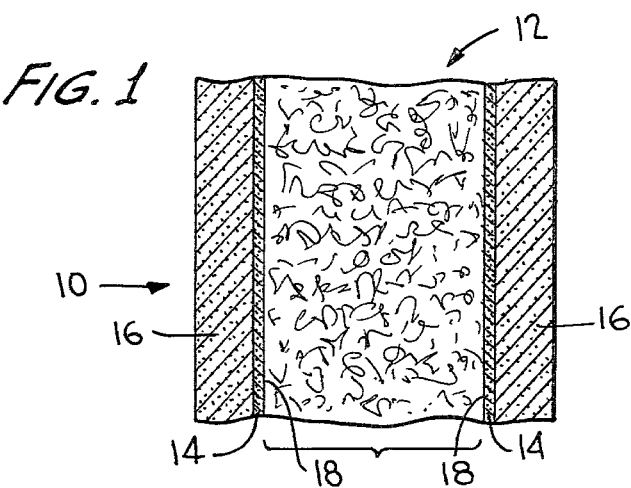

United States Patent [19]

Oswin

[11] 4,224,392

[45] Sep. 23, 1980

[54] NICKEL-OXIDE ELECTRODE STRUCTURE AND METHOD OF MAKING SAME

[76] Inventor: Harry G. Oswin, Winding Rd., Chauncey, N.Y. 10502

[21] Appl. No.: 861,421

[22] Filed: Dec. 16, 1977

[51] Int. Cl.$^2$ ............................................... H01M 6/04
[52] U.S. Cl. ................ 429/206; 429/223;222;225;229
[58] Field of Search ............... 429/223, 206, 235, 225, 429/226, 229, 209, 222

[56] References Cited

U.S. PATENT DOCUMENTS

| | | | |
|---|---|---|---|
| 3,321,286 | 5/1967 | Clark et al. | 429/223 X |
| 3,657,014 | 4/1972 | Faber | 429/235 X |
| 3,671,319 | 6/1972 | Arrange | 429/223 X |
| 3,933,520 | 1/1976 | Gay et al. | 429/223 X |
| 4,011,374 | 3/1977 | Kaun | 429/223 X |
| 4,048,408 | 9/1977 | Lola | 429/229 |
| 4,052,540 | 10/1977 | Smatko | 429/229 |

*Primary Examiner*—Charles F. LeFevour
*Attorney, Agent, or Firm*—A. W. Breiner

[57] ABSTRACT

Nickel-oxide electrode structures particularly suitable for use in mobile energy-storage applications comprising a highly porous carbon matrix having electrochemically active nickel hydroxide, i.e., NiO.OH, deposited within and in electrical contact with the carbon matrix sandwiched between two thin rigid supports, preferably magnesium. The surface of the support in contact with the carbon matrix can be coated with a metal such as gold to provide electrical conductivity. The electrodes are economically manufactured to provide a thick electrode having high porosity and large pore size while maintaining structural strength and stability, and which includes a large amount of electrochemically active nickel hydroxide therein.

14 Claims, 6 Drawing Figures

NICKEL-OXIDE ELECTRODE STRUCTURE AND METHOD OF MAKING SAME

FIELD OF INVENTION AND BACKGROUND

The present invention relates to electrodes for use in batteries. More particularly, the invention relates to nickel-oxide electrodes capable of being electrically recharged which are particularly useful in batteries having a nickel-cadmium; nickel-zinc, or nickel-hydrogen couple.

Nickel-oxide electrodes have been used in various types of batteries, and particularly rechargeable energy-storage batteries including nickel-cadmium, nickel-zinc, and nickel-hydrogen couples. During the energy producing phase of the cycle, i.e., discharge of the battery, the nickel electrode acts as the positive or oxidizing electrode. The battery can be recharged by applying energy. From such use, it is recognized that the nickel-oxide electrode is advantageous in view of its (1) high oxidizing potential; (2) high degree of reversibility, i.e., the electrode can be efficiently discharged and charged at high rates; and (3) low solubility in strong alkaline electrolytes which provides the basis for a long cycle life.

Accordingly, considerable interest has been developed in the nickel-oxide electrode in recent years for use in mobile energy-storage applications when combined with the zinc or hydrogen negative couples. However, for mobile energy-storage applications, such as electrical vehicle use, cost per kilowatt, cost per kilowatt hour, volume and weight per kilowatt, and volume and weight per kilowatt hour become important factors. The presently available nickel-oxide electrodes have been found to be inadequate to permit wide-scale use in mobile energy-storage applications from both cost and performance parameters.

More specifically, the nickel-oxide electrodes most widely used heretofore comprise a porous, usually sintered, nickel plaque as the current collecting substrate and support for the active nickel-oxide phase. The sintered nickel plaques are manufactured utilizing powder metallurgy processes which include either pressing dry nickel powder onto both sides of an expanded nickel sheet, or slurry coating an expanded nickel sheet with a suspension of nickel powder. The green compacts are then sintered in hydrogen atmospheres to produce the nickel plaques. The plaques are subsequently loaded with nickel hydroxide by vacuum impregnation or by electrochemical deposition or the like processes. When using an electrochemical deposition process, the porous plaque is polarized cathodically in an acidic, concentrated (2 molar) solution of nickel nitrate. As hydrogen ions are discharged on the nickel surface the pH increases inside the plaque and nickel hydroxide is precipitated on the nickel substrate. When the pores have been substantially filled with nickel hydroxide, the material is oxidized to the higher valency state by reversing polarity in alkaline solution and the plaque is then in an activated oxidized state ready for discharge.

There are recognized restraints and/or limitations in the processes as above noted for making nickel-oxide electrodes and in the performance characteristics and cost parameters of the resultant electrodes. One such restraint and limitation arises from a tradeoff between plaque porosity and mechanical strength. In order to obtain the highest possible loading of active nickel oxide, porosity should be as high as possible and the average pore size at least about 10 microns. However, because of the limitations on the nickel powders available, porous plaques having a porosity of greater than about 75 to 80 percent, at least to the extent of economic practicality, have inadequate mechanical strength for use as electrode structures. Additionally, with available nickel powders the pore size obtainable in the electrodes produced is relatively small, again from the standpoint of economic practicality. A further limitation is the inability to make a plaque thicker than about 0.040 inch based on the presently available materials and technology. This is because the thickness of the plaque is dictated primarily by two factors, (1) mechanical strength, it being recognized that as thickness of the sintered plaque increases the more fragile the plaque becomes; and (2) uniform loading of the sinter, it being recognized that as the sintered plaques increase in thickness it becomes progressively more difficult to uniformly load the interior of the plaque with the active nickel hydroxide. Moreover, when the electrode plaque is made by slurry coating of an expanded nickel sheet, the viscosity of the nickel powder slurry again limits the thickness of the plaque to no more than about 0.040 inch and, additionally, a porosity above about 75 to 80 percent is virtually impossible or impractical to obtain.

Since electrode thickness and high porosity are important cost parameters in making a commercially feasible electrode in that thick highly porous electrodes have larger capacities per unit area and, therefore, fewer electrodes are required to construct a battery of given ampere-hour capacity, attempts have been made to provide thick nickel-oxide electrode structures by combining conducting carbon particles with nickel-oxide powder and binding the materials together around a nickel expanded metal conductor with organic and/or inorganic binders stable in an electrolyte medium. The most commonly used binder has been polytetrafluoroethylene (PTFE). Although such electrodes have been successfully demonstrated, they have proven inadequate in terms of mechanical life and material cost to be completely practical.

OBJECTS AND GENERAL DESCRIPTION

Accordingly, it is a primary object of the present invention to provide a nickel-oxide electrode which can be economically produced which
  (1) is of sufficient thickness to
    (a) provide essential ampere-hour capacity within a practical sized battery,
    (b) permit efficient discharge and recharge,
    (c) have essential ionic and electronic conductivity to provide an efficient electrode and battery while
    (d) permitting effective diffusion of electrolyte species through the electrode;
  (2) has sufficiently high porosity and large pore size to permit adequate diffusion of electrolyte into and out of the electrode and to permit deposit of large amounts of active NiO.OH;
  (3) has essential mechanical strength and stability; and
  (4) has low weight and volume to permit a practical battery for mobile energy-storage application.

It is another primary object of this invention to provide an efficient and economical method of depositing electrochemically active nickel oxide into a support structure.

Briefly, the primary objects of the invention are accomplished by producing an electrode which comprises a highly porous carbon matrix impregnated with active nickel hydroxide, sandwiched between two rigid supports which will function as a conductor and separator.

The porous carbon matrix is preferably made up of electrically conductive fiberlike carbon filaments with the active nickel hydroxide being deposited on the filaments and within the internal surfaces of the matrix, and in electrical contact with the matrix. For convenience in manufacture, the carbon matrix can be and preferably is continuous, flexible, and compressible. A commercially available carbon mat which can be used is sold under the tradename THORNEL. However, other carbon mats can be used as well.

One important feature of this invention is that the carbon mats, since they have porosities of at least above about 80 percent and normally porosities of above about 90 percent and as high as 97 to 98 percent and have large pore volumes, permit easy access for the impregnating solutions permitting the deposit of large amounts of the active nickel hydroxide. As an additional feature of the invention, the matrix can be compressed to achieve the desired open pore volume and pore size range either before or after loading with the nickel hydroxide. If desired for a particular application, more conducting material such as chopped or milled carbon fibers, nickel particles, or the like, can be incorporated within the matrix during the impregnating process.

The carbon matrix before or after loading with the nickel hydroxide is sandwiched between two rigid supports. These supports are designed to be as thin and porous as possible consistent with adequate mechanical strength and stability. It has been found that structures depending upon the material selected which have a thickness as low as 0.002 to 0.01 inch with a pore volume or open area in the range of 35 to 80 percent provide the essential mechanical stability and integrity. The preferred support material is magnesium or an alloy of magnesium. Magnesium and its alloys are desirable in view of their low density, stability in alkaline media, rigidity, and low cost. Moreover, magnesium when in contact with an alkaline medium provides a stable, insoluble, relatively non-conductive oxide film at the positive potentials of a nickel-oxide couple battery. As a result, organic material such as cellulose or polypropylene, commonly used as separators in batteries, which normally oxidize when in contact with active nickel oxide will be stable for long periods when in contact with the magnesium oxide film formed in the presence of the alkaline medium.

Although it is not completely essential for all applications, if increased conductivity of the electrode is desired, the inner surface of the magnesium support, i.e., the surface in contact with the carbon matrix, can be made conductive by plating thereon a stable conductor such as nickel, silver, gold, or the like. In the application of the conductive surface, care must be taken to see that the conductors are not deposited on the outer surface of the support. The conductive inner surface of the porous magnesium being in contact with the nickel oxide impregnating the carbon matrix provides good conductivity and, accordingly, low resistance between the two components. Increased conductivity can be achieved by compression of the carbon matrix between the magnesium or the like supports, or by bonding of the carbon matrix to the magnesium sheets by use of graphite or metallic containing binders. The latter techniques can be used in addition to or in lieu of the deposition of a conductive coating such as nickel, silver, or gold.

The porous magnesium sheet can be utilized in various forms. A preferred form is a sheet fabricated from magnesium powder having at least 50 percent porosity and pores in the range of 20 to 200 microns. Alternatively, the porous sheet can be fabricated from a perforated material or expanded sheet metal. The ultimate objective is to provide an adequate combination of porosity and strength inasmuch as the magnesium sheet acts both as a support and separator. The support can be fabricated according to the ultimate end application in ribbed, corrugated, waffled, or the like configurations to provide maximum rigidity.

The carbon mat can be loaded with active NiO.OH using various techniques known in the art, either before or after being placed in contact with the support member, including vacuum impregnation or electrochemical deposition. A particularly advantageous electrode is obtained, however, by the novel method of electrophoretical deposition of the nickel hydroxide particles on and within the carbon matrix as will be fully developed hereinafter.

PREFERRED EMBODIMENT IN REFERENCE TO DRAWING

Figure 2:
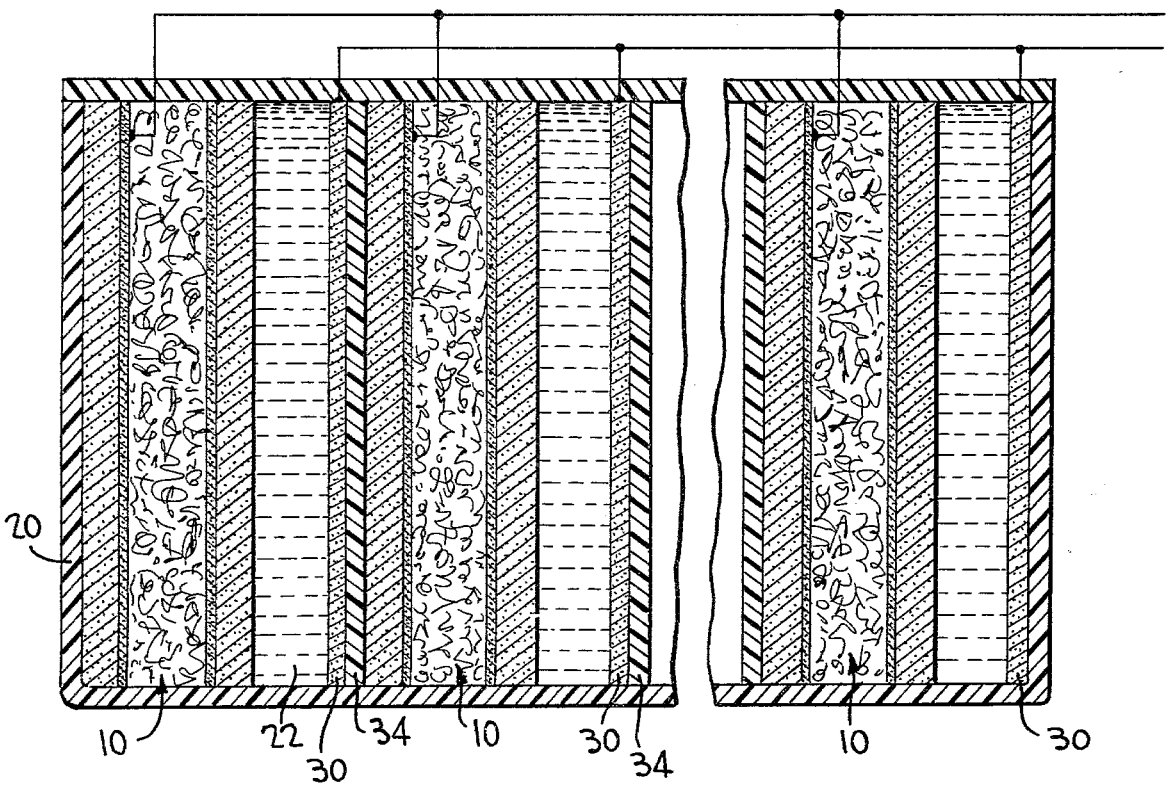
Figure 3A:
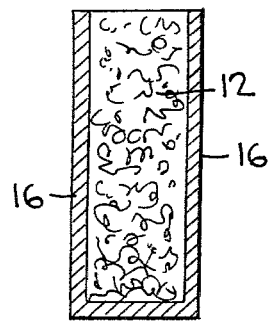
Figure 3B:
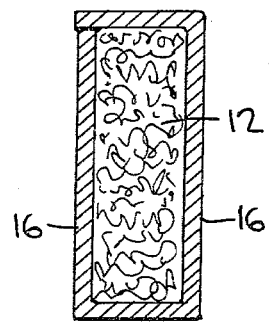
Figure 3C:
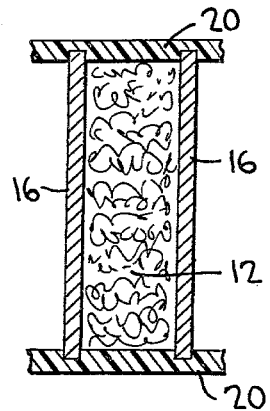
Figure 4:
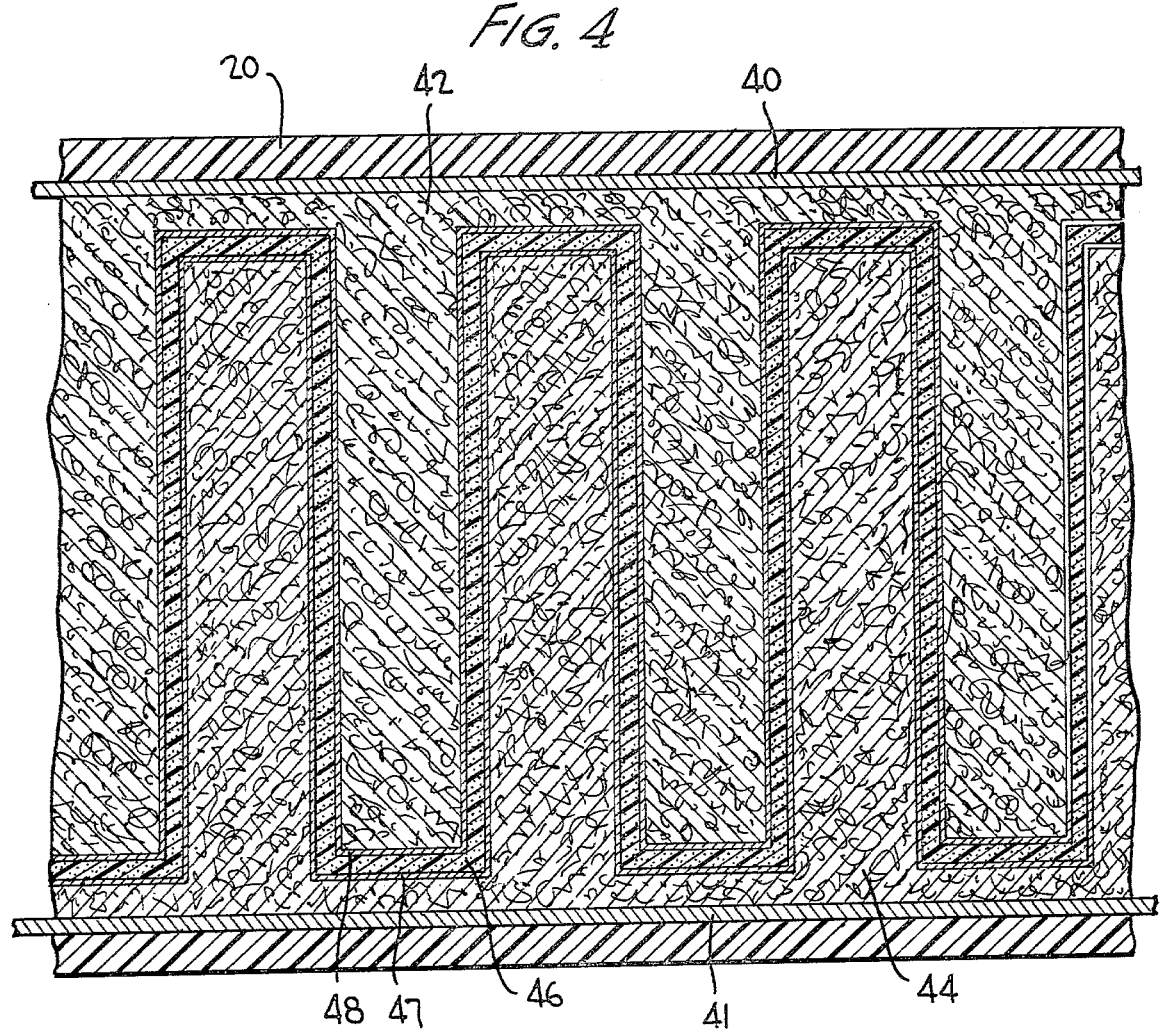

Having described the invention in general terms, preferred embodiments as presently contemplated will be described with reference to the drawing wherein like numerals describe like elements and wherein FIG. 1 is a fragmentary cross-sectional view of an electrode in accordance with this invention;

FIG. 2 is a fragmentary cross-sectional view of a battery utilizing the electrodes of FIG. 1;

FIGS. 3a, 3b, and 3c describe alternative designs of the ultimate electrode configuration for use in a battery; and FIG. 4 is a fragmentary cross-sectional view of a battery utilizing electrodes made in accordance with this invention.

Referring to FIG. 1 of the drawing, the electrode 10 of this invention comprises two basic components. The first basic component comprises a porous carbon matrix 12 coated and/or impregnated with active nickel oxide. The second basic component comprises rigid support members 14 at each surface of the carbon matrix which includes a porous magnesium sheet 16 coated at the surface in contact with the carbon matrix with a conductive layer 18. In the illustrated embodiment, shown in exaggeration, the electrode will have a thickness ranging from about 0.025 to 0.550 inch, and preferably from about 0.05 to 0.450 inch depending upon the end application of the battery.

The electrode of the present invention can be assembled into a battery having a parallel plate configuration as shown in FIG. 2. In FIG. 2, the battery comprises a housing 20 of plastic material, preferably a thermoplastic such as Bakelite, and contains therein a plurality of electrodes 10 spaced by an electrolyte medium 22 from a counter-electrode 30 which, as shown, is a porous zinc sheet. However, this electrode can be cadmium or a hydrogen electrode as known in the art. Again as shown, electrode 30 is separated from a second electrode 10 by means of a polypropylene separator 34. However, it is possible to dispense with separator 34 for many applications where the magnesium support member has formed a non-conductive, or substantially non-conductive oxide film at its surface. The preferred electrolyte for use in the battery shown in FIG. 2 is an alkaline material such as potassium hydroxide, sodium hydroxide, or cesium hydroxide, rubidium hydroxide, or mixtures thereof. Additionally, it is possible to use other electrolyte materials which are compatible with the battery system.

The electrodes of this invention can be designed in various configurations to permit convenient assembly into a battery of the desired characteristics. For example, the porous magnesium sheets 16 can be formed into a boxlike structure having sides and the bottom formed in one piece, bent or joined by welding with an open top as shown in FIG. 3a. The porous carbon matrix 12 containing the active nickel hydroxide is positioned within this framework. As shown in FIG. 3b, the structure of FIG. 3a can include a top section. Alternatively, as depicted in FIG. 3c, the supports 16 can be located and held in vertical grooves provided within the walls of the battery housing 20 with the carbon matrix 12 contained within the supports. However, as will be apparent to one skilled in the art, various configurations can be provided which will fall within the scope of the present invention.

The porous nickel matrix can be impregnated with active nickel oxide, i.e., NiO·OH or Ni(OH)$_2$, using various techniques, including vacuum impregnation, use of molten salts, and/or electrochemical impregnation. Heretofore in the preparation of nickel-oxide electrodes utilizing porous nickel plaques, electrochemical impregnation utilized a solution of nickel nitrate in weak acid. The nickel plaque was polarized cathodically, liberating hydrogen in the pores of the nickel plaque and causing the solution to become alkaline when hydrogen evolution occurred. The increase in pH caused local precipitation of nickel hydroxide according to the equation- $$2H_2O + 2e^- \rightarrow H_2 + 2OH^- \quad (a)$$

$$Ni^{++} + 2OH^- \rightarrow Ni(OH)_2 \quad (b)$$

Gas evolution causes replenishment of the nickel nitrate inside the plaque and precipitation of nickel hydroxide continued until the pores were filled or loaded. After impregnation with the nickel hydroxide it is necessary to carefully wash the electrode structures to remove nitrates, nitrites, and other ions from the impregnated plaque. Thereafter, the nickel hydroxide impregnated plaque is subsequently activated by anodization in an alkaline solution according to the equation $$2 Ni(OH)_2 + 2OH^- \rightarrow 2 NiO\cdot OH + 2 H_2O + 2e^-$$

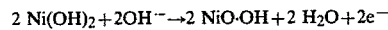

It has been found, however, that the technique as hereinbefore described has certain disadvantages from a mass production standpoint. Specifically, the process is slow and with plaques having a thickness of no more than about 0.035 inch complete loading requires in excess of an hour. An additional disadvantage is that the solution must be continually analyzed and the concentration of nickel nitrate and the acidifying agent maintained within specific ranges. Further, if the process is not carefully controlled, many of the pores become plugged completely with nickel hydroxide and, thus, become useless in subsequent electrochemical activity of the battery since electrolyte cannot contact the nickel hydroxide and, accordingly, cannot contribute to the overall electrode capacity. The aforesaid difficulties are compounded with electrodes of increasing thickness as made in accordance with the present invention.

Accordingly, although the aforesaid electrochemical technique can be used in fabricating the electrodes of the present invention, a preferred method heretofore unknown deposits nickel hydroxide particles electrophoretically on the internal surfaces of the conducting matrix. According to this process, colloidal particles of nickel hydroxide are suspended in a weak electrolyte, and a voltage is applied between the conducting positive matrix which is to be impregnated and any suitable counter-electrode. Polarization of the matrix can be by positive-ion or negative-ion depending on the nature of the charge of the colloidal nickel hydroxide particles. For example, positively charged nickel hydroxide (Ni(OH)$_2$) can be deposited electrophoretically by making the matrix negative, i.e., cathodic polarization. The electrophoretic deposition will continue until all of the exposed conducting surfaces of the matrix are covered by non-conducting nickel hydroxide particles. Thus, the process is self-regulating. In this regard, cathodic deposition of positively charged nickel hydroxide particles is preferred wherein the matrix is anodically polarized, and the deposited nickel hydroxide (Ni(OH)$_2$) is oxidized to NiO·OH which is conducting and on which additional nickel hydroxide particles can be deposited. When the matrix has been uniformly coated with a layer of nickel hydroxide particles, the matrix is transferred to an alkaline solution and the matrix is polarized anodically and converts the nickel hydroxide layer to the electrochemically active NiO·OH form. The process can be repeated whereby electrophoretic deposition of another Ni(OH)$_2$ layer is performed, followed by anodization to NiO·OH to provide an electrode having the desired amount of deposited NiO·OH.

As will be apparent, the aforesaid technique lends itself to mass production wherein the matrix to be loaded with NiO·OH is transferred from one to another of a series of baths containing colloidal Ni(OH)$_2$ and alkali alternately. A major advantage of the aforesaid process is its speed. Since colloidal particles can be up to 10 microns in diameter, material can be deposited much more quickly than by using a Faraday electrochemical process which depends on the discharge of the surfaces of individual hydrogen ions. Deposition of the nickel hydroxide on the surface will occur when most of the surface colloidal charge has been discharged on the electrode surface. Thus, for a 1 micron particle of nickel hydroxide, deposition will occur with only a fraction of the charge transfer required to deposit the equivalent amount of nickel hydroxide from nickel nitrate solution (acidic) by discharge of hydrogen ions. As will be apparent, lower power costs are realized.

In the aforesaid technique, to obtain even deposition of the nickel hydroxide throughout the matrix, the size of the colloidal particles preferably are controlled to be less than the pore diameter of the matrix, otherwise colloidal nickel hydroxide will not penetrate into the interior of the matrix.

Although the process of the present invention is preferred for impregnating the carbon filter matrix as previously described, as will be apparent to one skilled in the art the process can be utilized to impregnate any porous conductive matrix. Additionally, as will be apparent to one skilled in the art, the colloidal particles of nickel hydroxide in suspension can be produced in various sizes with the positive-ion or negative-ion charge being controlled by use of select nickel salts, their concentrations, and the alkaline medium used to precipitate the nickel hydroxide. Soluble salts such as the acetates, chlorides, nitrates, and sulphates can be used with alkaline solutions including the alkali hydroxides, ammonium hydroxides, and the like. If desired, material such as cobalt can be co-precipitated with the nickel hydroxide to improve the capacity of the NiO·OH. By choice of material, it is possible to design the system so that the final waste materials are easily disposed of or can be recovered for a subsequent use.

Furthermore, although the present invention has been described with reference to a nickel-oxide electrode, it is possible, as will be apparent to one skilled in the art, to utilize the concepts of the present invention to make other than nickel-oxide electrodes including electrodes wherein the active material within the carbon matrix is zinc, cadmium, or the like. Moreover, the concept of the present invention is applicable to a lead-acid battery construction. One type of construction found particularly useful is as set forth in the fragmented battery design of FIG. 4. In FIG. 4, battery housing 20 is any rigid plastic material having adequate strength such as Bakelite. Conductive layers 40 and 41 which function as the main current collectors of the battery, and which may be lead, a lead alloy, or an expanded metal, are located at both the top and the bottom of the battery, respectively, adjacent to housing 20. Conductive layer 40 is in direct contact with a first lead (Pb) electrode 42, and the other conductive layer 41 is in direct contact with the second lead oxide ($PbO_2$) electrode 44. Electrodes 42 and 44 are defined and separated by separator element 46 which, as illustrated, has a conductive layer 47 and 48 at each surface.

Electrodes 42 and 44 are each formed from continuous sheets of carbon fiber felt containing the positive lead oxide or negative lead material uniformly deposited on or within the felt. The fibers can be lead plated first in order to provide improved conductivity of the matrix, but this is not essential. The porous separator, preferably porous polypropylene, is impregnated with the acid electrolyte, i.e., sulfuric acid, as are electrodes 42 and 44. As such, the electrolyte fully impregnates the entire battery. A major advantage of the design shown is that no joining is necessary to achieve a parallel design since the electrodes, separators, and current collectors are one continuous piece for each cell. No problems associated with breaking of electrical connections or the like are possible.

The above and other embodiments will be apparent to one skilled in the art and fall within the scope of the present invention.

It is claimed:

1. An electrode comprising a porous carbon matrix having a porosity of at least about 80 percent having deposited on and within said matrix an electrochemically active nickel oxide, and a rigid porous magnesium support member on each major surface of said matrix.

2. The electrode of claim 1 wherein the porosity of said carbon matrix is above about 90 percent.

3. The electrode of claim 2 wherein the carbon matrix comprises carbon filaments.

4. The electrode of claim 3 wherein said magnesium support has a conductive coating on the surface thereof in contact with said carbon matrix.

5. The electrode of claim 4 wherein said coating is gold.

6. The electrode of claim 4 wherein said coating is nickel.

7. A battery comprising a housing, an electrode of claim 1, a counter-electrode, and an electrolyte separating said electrodes.

8. The battery of claim 7 wherein the counter-electrode is a zinc electrode and the electrolyte is an alkali hydroxide.

9. The battery of claim 7 wherein the counter-electrode is a hydrogen electrode and the electrolyte is an alkali hydroxide.

10. An electrode comprising a porous carbon matrix having a porosity of at least about 80 percent having deposited on and within said matrix an electrochemically active material selected from the group consisting of zinc, cadmium, lead, nickel, and electrochemically active compounds thereof, and a rigid porous support member on each major surface of said matrix.

11. The electrode of claim 10 wherein the electrochemically active material is zinc.

12. The electrode of claim 11 wherein the support member is magnesium.

13. The electrode of claim 12 wherein the magnesium support has a conductive coating on the surface thereof in contact with the carbon matrix.

14. The electrode of claim 10 wherein the electrochemically active material is lead.

* * * * *